United States Patent [19]
Viney et al.

[11] Patent Number: 6,034,722
[45] Date of Patent: Mar. 7, 2000

[54] REMOTE CONTROL AND VIEWING FOR A TOTAL STATION

[75] Inventors: Ian T. Viney, Christchurch, New Zealand; Geoffrey R. Kirk, San Francisco, Calif.

[73] Assignee: Trimble Navigation Limited, Sunnyvale, Calif.

[21] Appl. No.: 08/962,861

[22] Filed: Nov. 3, 1997

[51] Int. Cl.[7] .............................. H04N 7/18; G01C 3/08; G01C 15/00; G01S 5/02

[52] U.S. Cl. .......................... 348/135; 348/142; 348/211

[58] Field of Search ............................. 348/116, 83, 135, 348/142, 211, 212, 213; 702/150; H04N 7/18

[56] References Cited

U.S. PATENT DOCUMENTS

| | | | |
|---|---|---|---|
| 4,532,545 | 7/1985 | Hanson | 348/83 |
| 4,682,218 | 7/1987 | Kaneko | 348/116 |
| 5,291,262 | 3/1994 | Dunne | 356/5.06 |
| 5,421,096 | 6/1995 | Ross | 33/290 |
| 5,512,905 | 4/1996 | Nichols | 342/357.06 |

FOREIGN PATENT DOCUMENTS

| | | |
|---|---|---|
| 9-142773 | 6/1997 | Japan . |
| 1409017 | 10/1975 | United Kingdom . |
| 2128842 | 5/1984 | United Kingdom . |
| 9534849 | 12/1995 | WIPO . |

OTHER PUBLICATIONS

"IBM Demonstrates Family of Six MPEG–2 Encoder and Decoder Chips at the NAB," IBM Corporation, Apr. 15, 1996, 2 pages.

"MPEG–FAQ 4.1:Some MPEG Chips," Downloaded from http://ftp.sunet.se/mpeg1/mpegfaq/mpe9334.html on Nov. 3, 1997, 1 page.

"IBM MPEG–2 (IPB) Encoder Chip Set," IBM Corporation, Downloaded from http://www.chips.ibm.com/products/mpeg/mpegse30.html on Nov. 3, 1997, 3 pages.

"8x8's Video PCI Interface Chip VPIC," 8x8, Inc., Downloaded from http://www.8x8.com/docs/chips/vpic.html on Nov. 3, 1997, 2 pages.

*Primary Examiner*—Howard Britton
*Attorney, Agent, or Firm*—Blakely, Sokoloff, Taylor & Zafman LLP

[57] ABSTRACT

A method and apparatus are provided for performing remote control and viewing with a total station. The total station is operated remotely from a remote control and viewing unit (RCVU) by a single user. The total station has a measurement unit, a video camera aligned with the measurement unit for acquiring real-time images of a target, and a transceiver for transmitting video images to the RCVU and for receiving control data from the RCVU. The RCVU includes a transceiver for transmitting the control data to the total station and for receiving the video images from the total station. The RCVU also includes a display device for displaying real-time video images from the camera and includes controls for allowing the user to remotely align the total station with the target using the displayed video images. A fine-tuning focus control on the RCVU allows the user to remotely focus the camera. The RCVU also includes an alphanumeric input device for allowing the user to enter text, which can be stored locally in the RCVU or in the total station in association with acquired measurements and images data.

46 Claims, 4 Drawing Sheets

REMOTE CONTROL AND VIEWING FOR A TOTAL STATION

FIELD OF THE INVENTION

The present invention pertains to the field of survey devices. More particularly, the present invention relates to a method and apparatus for controlling a total station to locate a target.

BACKGROUND OF THE INVENTION

The art of surveying involves the determination of an unknown position from angular and distance measurements taken from one or more reference positions. A surveying device that is frequently used to acquire such measurements is a total station. In operation, the user generally aligns the total station at a target held by a second user. With a conventional total station, the pointing ("alignment") process is achieved optically by the user's visually locating the target through a viewfinder on the total station.

Early total stations required at least two people to acquire a set of measurements, i.e., one person to place the target and another person to sight the target from the total station. However, it is often desirable to reduce the number of people required to operate the surveying equipment. Consequently, robotic total stations have been developed to assist in locating a target. A robotic total station eliminates the need for a user at the location of the total station. Instead, the single user is at the target and sights the total station visually from the target. Upon visually locating the total station, the user initiates an angular scanning sequence at the total station to obtain more precise angular and distance measurements. The robotic total station then automatically aligns itself with the target. Servo motors in the total station cause the total station to be rotated towards the target. Once the total station is aligned with the reflective target, the angle and distance measurements can be taken. Examples of robotic surveying systems include the Geodimeter System 600 manufactured by Geotronics AB of Sweden, and the TPS-System 1000 total station manufactured by Leica of Switzerland. One problem associated with many robotic total stations is that they tend to have difficulty locating the target. Consequently, with many robotic total stations, the user at the target frequently must return to the total station to make fine tuning adjustments.

Another type of surveying device which reduces the number of required operators is a reflectorless system. Reflectorless systems do not require a second user at the target. These systems are particularly useful when the target is relatively inaccessible. However, reflectorless total stations still require the user to remain at the total station to sight the target.

Hence, what is need is a total station based surveying system which not only can be operated by a single user, but also provides the user with greater freedom of movement, such that the user is not confined to the immediate vicinity of the target or the total station.

SUMMARY OF THE INVENTION

One aspect of the present invention is a method of operating a surveying device in which the surveying device is controlled from a remote location using visual feedback provided to the remote location by the surveying device.

Another aspect of the present invention is an apparatus for remotely controlling a surveying device that has a camera for acquiring real-time images. The apparatus is operable by a user to acquire real-time images of a target to remotely align the surveying device with the target. The apparatus includes a receiver for receiving image data generated by the camera and transmitted to the apparatus by the surveying device, and a display device which receives the image data that was received from the surveying device and which display images in response to the image data. The apparatus further includes an input device for receiving user inputs to remotely control the camera, and a transmitter which transmits control data to the surveying device based on the user inputs.

Yet another aspect of the present invention is a surveying device which includes: a control unit, a camera coupled to the control unit, a measurement unit coupled to the control unit, a transmitter coupled to the control unit for transmitting image data to a remote control unit based on output of the camera, and a receiver coupled to the control unit for receiving control data from the remote control unit. The surveying device varies an orientation of the camera in response to the control data received from the remote control device.

Still another aspect of the present invention is a surveying system which includes a surveying device, which includes a camera, and a remote control unit in communication with the surveying device over a link. The remote control unit includes: an input device for receiving user inputs to remotely control the camera, a transmitter for transmitting control data to the surveying device in response to the user inputs, a receiver for receiving image data transmitted from the surveying device based on output of the camera, and a display device for displaying images based on the image data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing remote control and viewing with a total station are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

As will be described below, the present invention includes a total station based surveying system which can be operated remotely by a single user. The total station is equipped with a video camera to acquire real-time video images of the target, which are transmitted to and displayed on a remote control and viewing unit (RCVU). Using the images displayed on the RCVU, a user operates controls on the RCVU to remotely align the total station with the target and to remotely command the total station to acquire survey measurements. Using the present invention, the user is not required to be located at either the target or the total station to acquire survey measurements. Further, the user can quickly and easily realign the total station to measure different targets from the RCVU.

Figure 1:
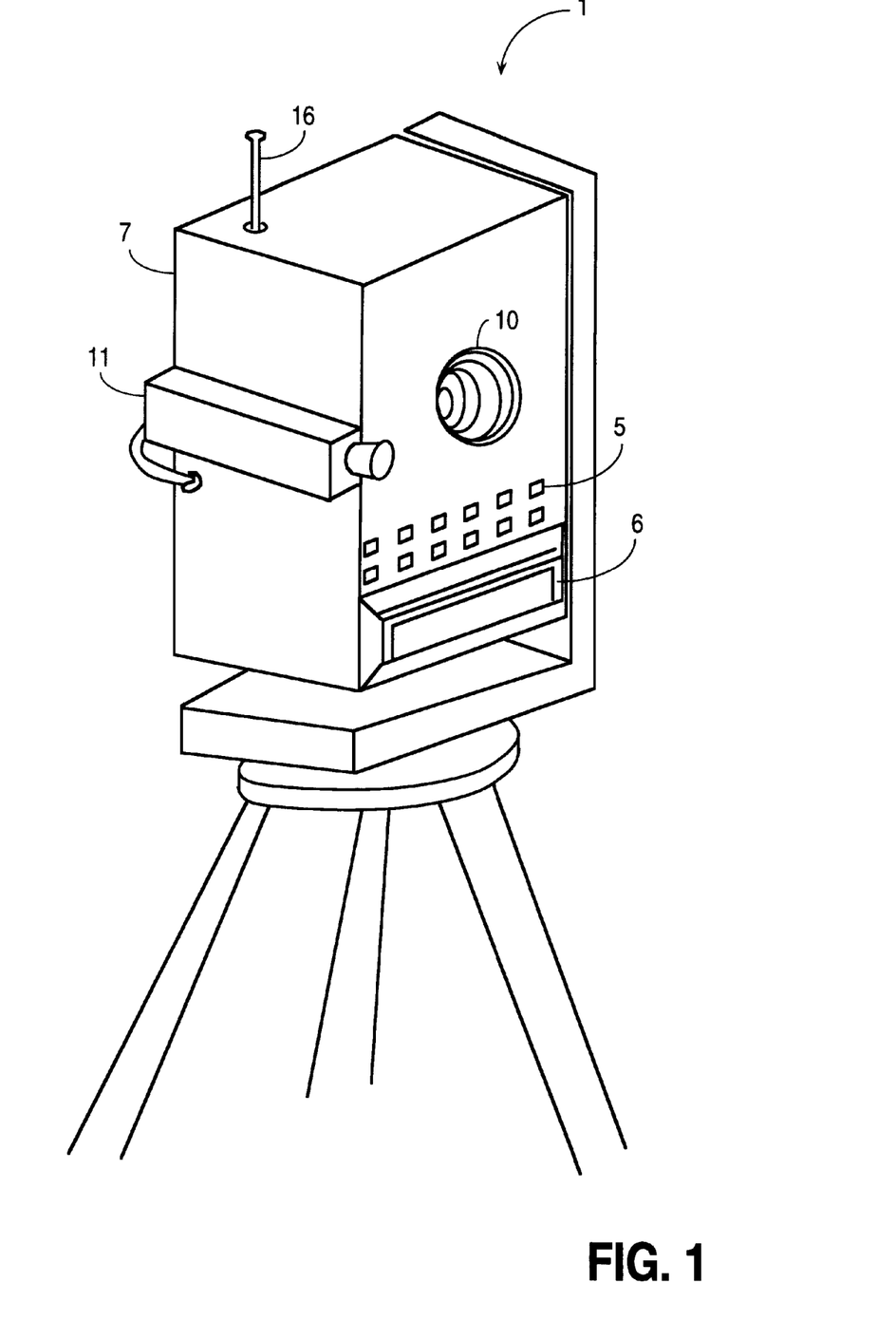
FIG. 1 illustrates a total station which includes a video camera.

FIG. 1 illustrates a total station 1 according to one embodiment of the present invention. The total station 1 includes conventional measurement equipment for acquiring angle (i.e., horizontal and vertical) and distance measurements of a target, a keypad 5 for entering data, and a display 6 for displaying data. In accordance with the present invention, the total station 1 also includes a video camera 11, which is used to generate images for sighting the target. The total station may also include a conventional optical sighting device 10, as shown in FIG. 1. Video data based on output of the camera 11 is transmitted over a wireless link to the RCVU, as will be discussed below. The video camera 11 may be an analog camera which outputs video data in National Television Standards Committee (NTSC) or Phase Alternating Line (PAL) format, for example. Alternatively, the camera 11 may be a digital camera which outputs video data in digital form. For purposes of description, however, it is henceforth assumed that the camera 11 is an analog camera.

Note that technology for processing video data is available "off-the-shelf" in the form of application-specific integrated circuit (ASIC) chips for encoding and/or decoding video. Such chips commonly digitize analog video and employ compression schemes appropriate for video data, an examples of which are the Motion Picture Experts Group (MPEG) II scheme, also known as "MPEG 2", or RealVideo from Progressive Networks. ASIC chips such as these are commonly found in, for example, "videophone" products that operate on ordinary telephone lines, Internet video conferencing systems, and consumer television sets.

In the total station 1 of the present invention, video information from the camera 11 is provided to such an ASIC, as will be further described below. The resulting digital data stream is then forwarded to a transceiver for transmission from the total station 1 to the RCVU. In the RCVU, the received data stream is received, demodulated, provided to another ASIC for decompression and conversion back to NTSC, PAL, or other suitable video format, and then provided to a display device for viewing by a user.

Referring still to FIG. 1, the video camera 11 is incorporated into the total station 1 so that its line of sight accurately corresponds to measurements taken by the measurement equipment. If the total station also includes a conventional sighting device 10, then the video camera 11 is incorporated into the total station 1 so that its line of sight is substantially identical to that of the optical sighting device 10. In the embodiment shown, the video camera 11 is mounted to the external housing 7 of the total station 1. In alternative embodiments, however, the camera 11 may be located inside the housing 7 of the total station 1. Further, the camera 11 may be integrated into the conventional sighting device 10 to ensure that the line of sight of the camera 11 is essentially the same as that of the scope 10. Hence, there are numerous ways of incorporating the video camera 11 into the total station 1 within the scope of the present invention.

By using the camera 11 in accordance with the present invention, it is not necessary to equip the total station with a conventional optical sighting device, such as device 10. Nonetheless, it may be desirable to equip the total station with such a device to facilitate testing and set-up of the total station.

In certain embodiments, the camera 11 may also have a viewfinder, which enables the camera to be used as a conventional sighting device from the total station 1, and which may be used to properly align the camera 11 when mounting the camera 11 to the total station 1.

Figure 2:
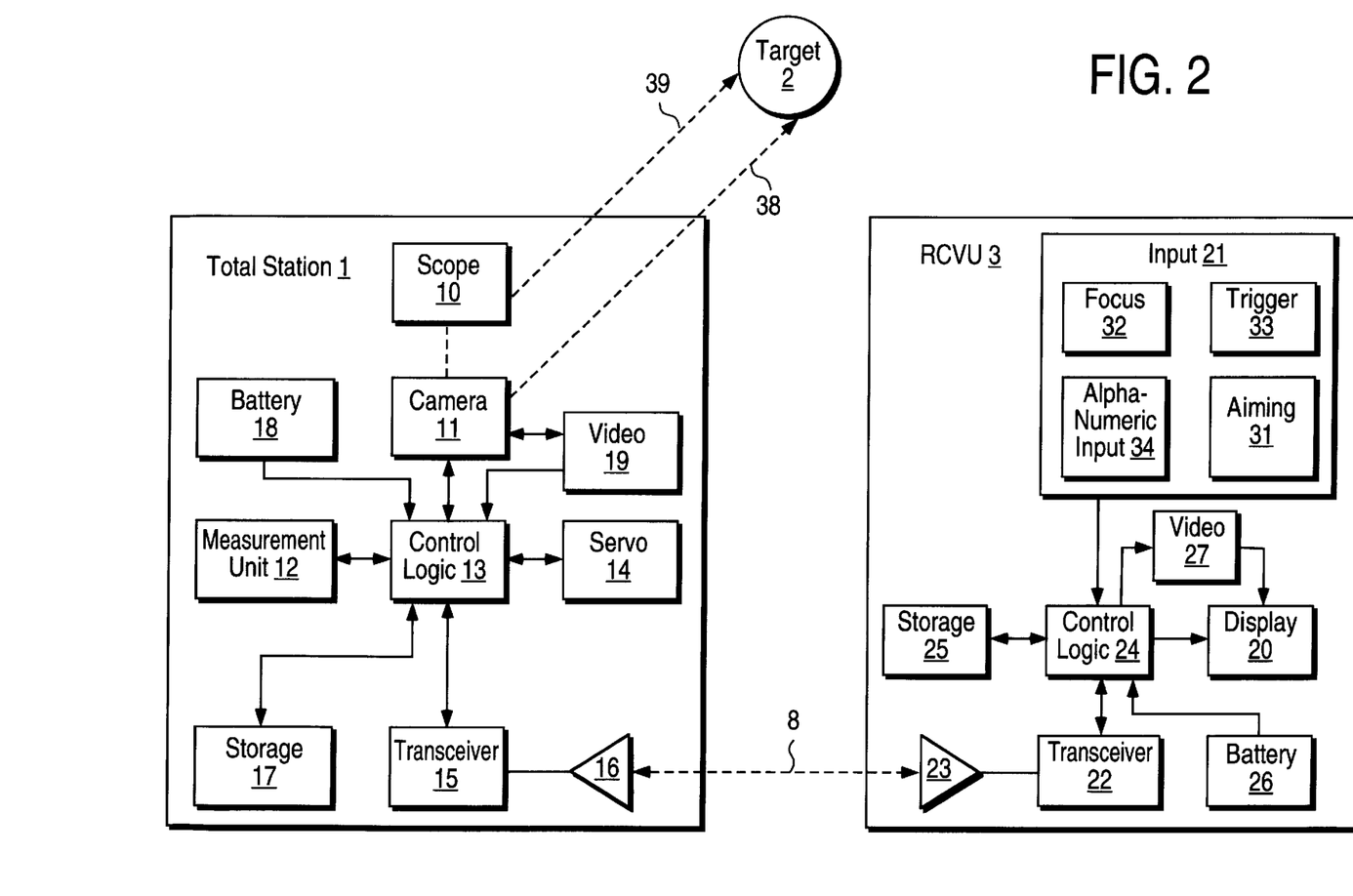
FIG. 2 is a block diagram illustrating a total station and a remote control and viewing unit (RCVU).

FIG. 2 shows a conceptual block diagram of the surveying system of the present invention, according to one embodiment. The RCVU 3 is operated by a user to remotely control the total station 1 to acquire measurements of the target 2. The total station 1 and the RCVU 3 communicate with each other over a communication link 8, which is preferably a wireless (e.g., RF) link.

In the illustrated embodiment, the total station 1 includes a conventional optical sighting apparatus 10 (hereinafter the "scope 10"), such as a telescope, a video camera 11, a measurement unit 12, control logic 13, servo motors 14, a transceiver 15, an antenna 16, a storage device 17, a battery 18, and a video chip 19. The overall operation of the total station 1 is controlled by the control logic 13.

The video camera 11 is coupled to the control logic 13 and to the video chip 19. The video chip 19 can be an off-the-shelf ASIC of the type described above. The video chip 19 generally receives video output by the camera 11, digitizes the video (assuming the camera 11 is an analog camera), and then compresses the video according to a suitable compression scheme, such as MPEG2. The video chip 19 is coupled to provide the compressed, digitized video data to the control logic 13. Note that in alternative embodiments, these functions may be implemented in software instead of in the video chip 19.

Also coupled to the control logic 13 are the measurement unit 12, the servos 14, the transceiver 15, the storage device 17, and the battery 18. The battery 18 is coupled to the control logic 13 to provide power for the total station 1. The antenna 16 is coupled to the transceiver 15 for transmitting data to the RCVU 3, including video data from the camera 11, and for receiving data from the RCVU 3, including control data. The measurement unit 12 includes standard electronics and other apparatus for computing distance and angular measurements of a survey target. The storage device 17 may include any device or combination of devices suitable for storing data, such as conventional random access memory (RAM), flash memory, magnetic tape, magnetic or magneto-optical (MO) storage disk, recordable compact disk (CD-R), Digital Versatile Disk (DVD), or the like.

The transceiver 15 may be any device suitable for transmitting and receiving video data over a wireless data link. An example of a suitable transceiver is the Trimtalk™ ("Trimtalk") packet-based radio modem, which is available from Trimble Navigation Limited of Sunnyvale, Calif. The Trimtalk radio currently operates at 900 MHz in unlicensed bands available to the public and has a range of several kilometers. The available data rates currently range from 9.6 Kbps to 115 Kbps. Alternatively, a continuous RF channel may be employed in conjunction with a non-packetizing (continuous) modem.

As noted above, the camera 11 is integrated with the total station 1 such that the line of sight of the camera 11 (indicated by line 38 in FIG. 2) is substantially identical to the line of sight of the scope 10 (indicated by line 39 in FIG. 2). The servos 13 actuate motion of the total station 1 (e.g., rotation about a horizontal and/or vertical axis) to vary the angular settings. The camera 11 is fixedly mounted to the total station 1, such that rotating the total station 1 pans the field of view of the camera 11.

The total station 1 also includes the capability to transmit data other than video data to the RCVU 3, such as status information. This information may include, for example, the current angle and distance readings of the total station 1, confirmation that a measurement has been taken, the amount of memory available in storage device 17, and the remaining capacity of the battery 18.

The RCVU 3 includes a display device 20, an input unit 21, a transceiver 22, an antenna 23, control logic 24, a storage device 25, a battery 26, and a video chip 27. The control logic 24 controls the overall operation of the RCVU 3. Coupled to the control logic 24 are the display device 20, the input unit 21, the transceiver 22, the storage device 25, the battery 26, and the video decompression chip 27. The battery 26 provides power for the RCVU 3. The transceiver 22, which is also coupled to the antenna 23, is for receiving data from the total station 1, including the video image data, and for transmitting data to the total station 1, including the control data. Transceiver 22 may be a Trimtalk radio modem, a non-packetizing modem, or any other device suitable for communicating video data over the wireless link 8.

The video chip 27, which may be an ASIC of the type described above, decompresses digital video data received from the total station 1, converts the data back to an appropriate format for display (e.g., NTSC or PAL analog format), and provides the resulting data to the display device 20. In alternative embodiments, these functions may be implemented in software instead of in video chip 27.

The display device 20 displays images based on the data it receives from the video chip 27. The display device 20 may be any device suitable for displaying real-time images, such as a cathode ray tube (CRT), liquid crystal display (LCD), or the like. Storage 25 is may include any device or combination of devices suitable for storing data, such as RAM, flash memory, magnetic tape, magnetic or MO disk, CD-R, DVD, or the like.

Note that is not necessary that both the total station 1 and the RCVU 3 include a storage device for purposes of practicing the present invention. That is, either storage device 17 in the total station 1 or storage device 25 in the RCVU 3 would be sufficient.

The input unit 21 includes controls for allowing the user to remotely control the total station 1, including rotation of the total station 1 to visually locate the target and acquisition of survey measurements. Input commands entered by the user from the input unit 21 are processed by the control logic 24 and transmitted as control data by the transceiver 22 to the total station 1. This data may be transmitted on the same channel which carries the video data from the total station 1 to the RCVU 3. The controls include an aiming control 31, a focus control 32, a trigger input 33, and an alphanumeric input device 34. The aiming control 31 may be a joystick, trackball, touchpad, or any other suitable device which allows the user to manually command movement of the total station 1. The user accomplishes this movement using visual feedback provided from the total station 1 by the camera 11 and then displayed on the display device 20.

The focus control 32 allows the user to remotely fine tune the focus of the camera 11. Note that, certain embodiments, the camera may have automatic focusing capability, which may eliminate the need for the manual focus control 32.

The trigger unit 33 allows the user to command the total station to take a survey measurement. This input may be a simple push button or the like. The alphanumeric input device 34, which may be a conventional keyboard, allows the user to enter text or other symbolic data. This data can be stored in the RCVU 3 (e.g., in storage device 25), the total station 1 (e.g., in storage device 17), or both. Accordingly, annotations and explanatory information can be input by the user and stored in association with other stored data, such as survey measurements, image data, or both.

Storage device 17 in the total station 1 and storage device 25 in the RCVU 3 each may be used to record various types of information, including image data from the camera 11 (in the form of video or stills), alphanumeric data, or any of the other types of information mentioned above, or a combination of such types of information. Hence, these storage devices may be used to record all significant events which occur during a surveying session and to associate information of different types. For example, a particular set of survey measurements can be associated with a particular still image or video sequence of a target and/or to a passage of text, which can be retrieved together from memory. It may be desirable to store image data in the RCVU as it is received from the total station 1.

Figure 3:
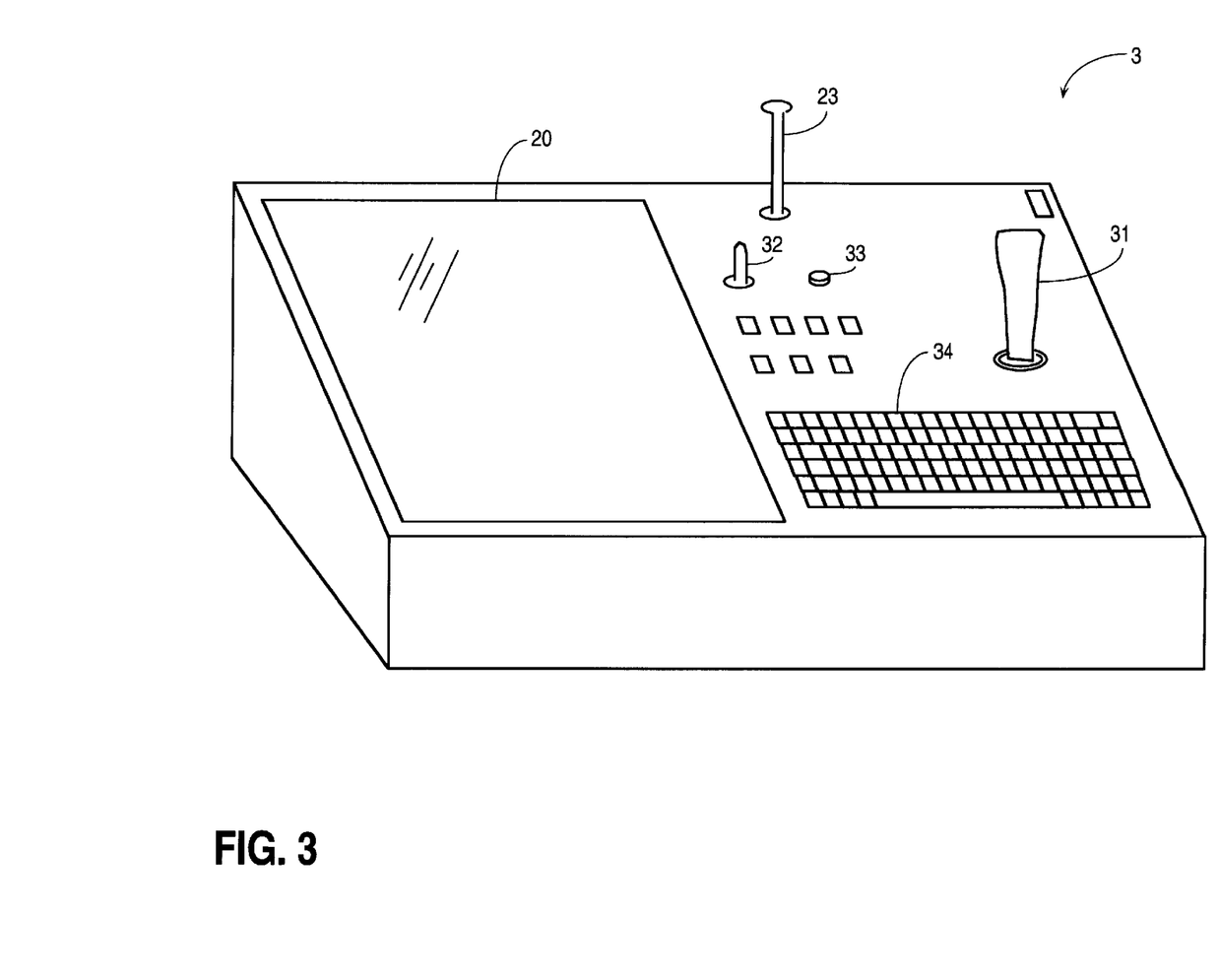
FIG. 3 illustrates a remote control and viewing unit (RCVU).

FIG. 3 shows an exterior view of the RCVU 3 according to one embodiment. The RCVU 3 can be embodied as a relatively compact and lightweight device which can be easily transported by one person. In the illustrated embodiment, the components of the RCVU 3 (display device 20, input unit 21, transceiver 22, antenna 23, control logic 24, storage device 25, and battery 26 are integrated into a single unit. However, in other embodiments, some or all of these elements may be physically separate from each other yet functionally connected.

Figure 4:
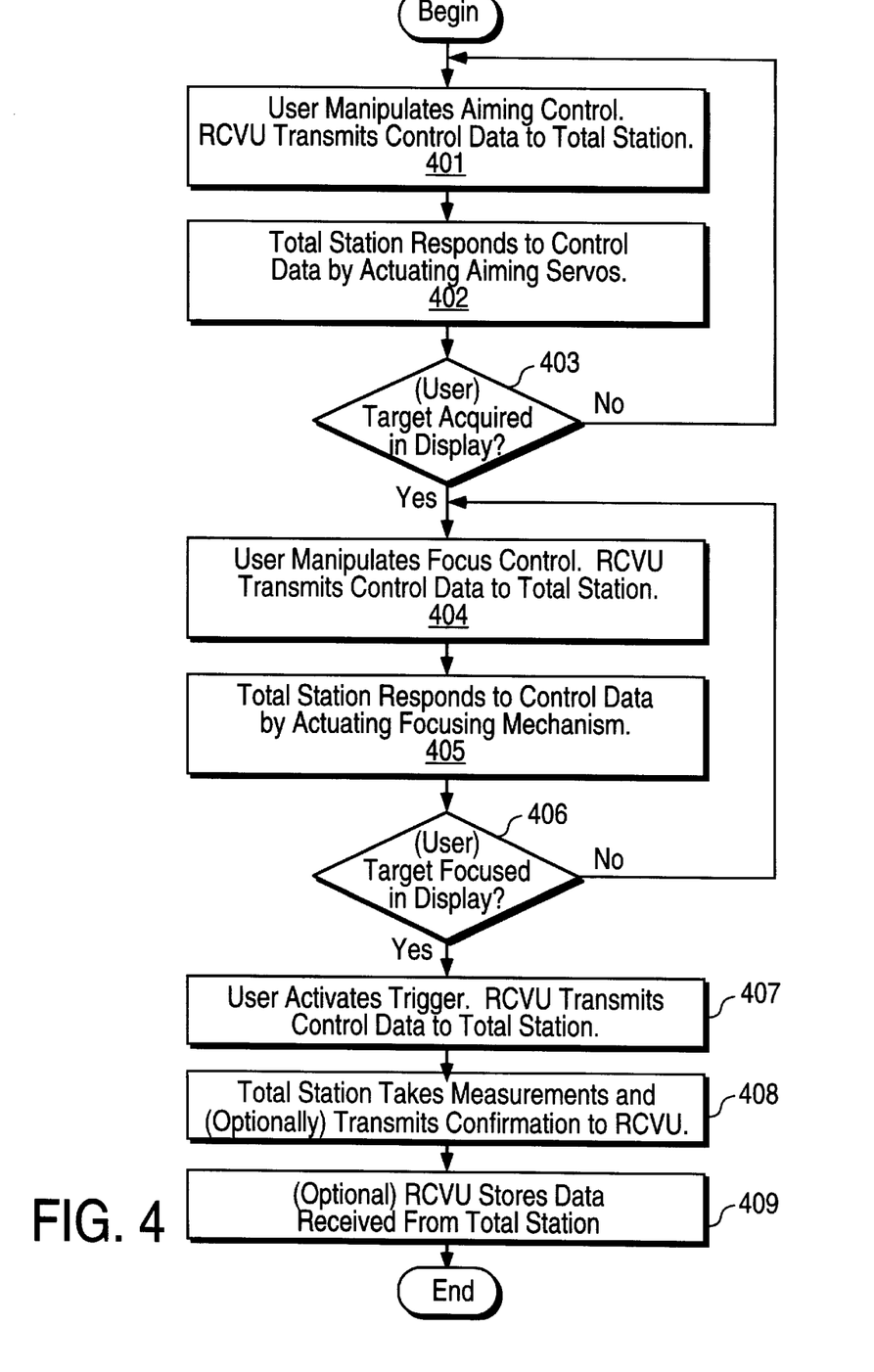
FIG. 4 is a flow diagram illustrating a routine for performing remote control and viewing with a total station.

FIG. 4 illustrates a routine for operating a surveying system according to one embodiment of the present invention. After setting up the total station 1, the user may place the RCVU 3 at essentially any location within the transmission ranges of transceivers 15 and 22, provided no obstacles are positioned to interfere with the communication link 8. The RCVU and the user do not need to be located at the total station 1 or the target 2. Further, the user can quickly and easily realign the total station to measure different targets from the RCVU. Thus, in step 401 the user manipulates the aiming control 31 to command the total station 1 to move (i.e., to rotate vertically and/or horizontally), and the RCVU 3 transmits control data to the total station 1 based on these user inputs. In step 402, the total station responds to the control data by actuating the appropriate servos 14 for the type of movement commanded. In step 403, the user relies upon the visual feedback provided by the camera 11 and the display device 20 to determine whether to continue manipulating the aiming control 31, i.e., to determine whether the target 2 is centered within the field of view of the camera 11.

Once the user has centered the target 2 within the field of view of the camera 11, the user manipulates the fine tuning focus control 32 in step 404, and the RCVU 3 transmits corresponding control data to the total station 1. In step 405, the total station responds to the received focus control data by actuating the focusing mechanism of the camera 11. In step 406, the user relies upon visual feedback provided by the camera 11 and the display device 20 to decide whether the target 2 is properly focused in the display. If not, the user continues to manipulate the focus control 32 until the target 2 is perceived to be in focus. Note that steps 304 through 306 may be omitted in embodiments in which the camera has automatic focusing capability.

Once the target 2 is in focus, in step 407 the user activates the trigger input 33, and the RCVU 3 responds to this input by transmitting corresponding control data to the total station 1. In step 408, the total station 1 responds to the trigger input control data by acquiring survey measurements (i.e., angles and, optionally, distance). In addition, the total station 1 may also transmit certain information to the RCVU 3, such as a confirmation that a measurement has been taken and/or the actual measurement data. In optional step 409, the RCVU 3 may store the data received from the total station 1.

Note that numerous variations on the above-described embodiments are possible within the scope of the present invention. For example, the video camera 11 and the images acquired with it have thus far been described as being based on the visible light spectrum. However, in alternative embodiments, the camera 11 may be designed to detect other portions of the electromagnetic spectrum, such as the infrared spectrum (i.e., for surveying at night) or the ultraviolet spectrum. Alternatively, the total station 1 may be equipped with one or more additional imaging devices for such purposes. In addition, the present invention and conventional robotic surveying systems are not mutually exclusive. For example, features of the present invention can be included in an otherwise conventional robotic surveying system. Further, a single RCVU of the present invention may be used to control multiple total stations, and a single total station may be controllable from multiple RCVUs.

Thus, a method and apparatus for performing remote control and viewing with a total station have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of remotely operating a surveying device for acquiring survey data of a target, the surveying device including a camera for generating images of the target, the method comprising the steps of:

receiving user inputs for remotely controlling the surveying device, including user inputs for controlling the camera to align the surveying device with the target;

transmitting control data to the surveying device over a wireless link in response to the user inputs, the control inputs for aligning the surveying device with the target;

receiving image data transmitted from the surveying device over the wireless link, the image data representing images acquired by the camera; and displaying images in response to the image data.

2. A method according to claim 1, wherein the surveying device comprises a total station.

3. A method according to claim 1, further comprising the step of storing the image data in a memory device in association with corresponding survey measurements.

4. A method according to claim 1, wherein the image data represents real-time video images.

5. A method according to claim 1, wherein the user imputs further comprise a trigger input for remotely causing the surveying device to acquire a survey measurement of the target.

6. A method according to claim 1, wherein the user inputs further comprise a focus input for remotely focusing the camera.

7. An apparatus for remotely controlling a surveying device, the surveying device having a camera for acquiring real-time images, the apparatus comprising:

a receiver for receiving image data generated by the camera and transmitted to the apparatus by the surveying device;

a display device coupled to receive the image data received from the surveying device and to display images in response to image data;

an input device for receiving user inputs for remotely controlling the surveying device; and a transmitter coupled to receive the user inputs, the transmitter transmitting control data to the surveying device based on the user inputs, such that the apparatus is operable by a user to acquire real-time images of a target to remotely align the surveying device with the target.

8. An apparatus according to claim 7, wherein the surveying device comprises a total station.

9. An apparatus according to claim 7, wherein the images comprise video images.

10. An apparatus according to claim 7, further comprising a memory coupled to receive the image data, the memory storing the image data in association with survey data acquired by the surveying device.

11. An apparatus according to claim 7, further comprising a trigger for receiving a trigger input, the trigger input for remotely causing the surveying device to generate a measurement of the target.

12. An apparatus according to claim 7, further comprising a focus control for receiving a focus input for remotely focusing the camera.

13. A device for remotely controlling a total station, the total station having a camera for sighting a survey target, the device comprising:

means for receiving user inputs for remotely acquiring the target within a field of view of the camera;

means for transmitting control inputs to the total station over a wireless link in response to the user inputs;

means for receiving image data transmitted from the total station over the wireless link; and means for displaying images based on the image data.

14. A device according to claim 13, wherein the images comprise real-time video images.

15. An apparatus according to claim 13, further comprising means for storing the image data in association with survey data acquired by the surveying device.

16. A device according to claim 13, wherein the user inputs for remotely controlling the camera comprise user inputs for remotely aiming the camera, such that the device is operable by a user to remotely align the total station with the target.

17. A device according to claim 13, further comprising means for receiving a trigger input for remotely causing the surveying device to obtain a measurement of the target.

18. A device according to claim 13, the device further comprising a focus input for remotely focusing the camera.

19. A surveying device for acquiring survey measurements of a target, the surveying device comprising:

a control unit;

a camera coupled to the control unit;

a measurement unit coupled to the control unit;

a transmitter coupled to the control unit for transmitting image data to a remote control unit over a wireless link based on output of the camera; and a receiver coupled to the control unit for receiving control data from the remote control unit over the wireless link, the surveying device varying an orientation of the camera in response to the control data received from the remote control device.

20. A surveying device according to claim 19, wherein the surveying device comprises a total station.

21. A surveying device according to claim 19, wherein the camera has a field of view, and wherein the measurement unit is configured to generate survey measurements of a target within the field of view of the camera.

22. A surveying device according to claim 21, further comprising a memory coupled to receive image data generated by the camera, the memory storing the image data in association with corresponding survey measurements generated by the measurement unit.

23. A surveying device according to claim 22, wherein the control data comprises trigger data, the trigger data corresponding to a trigger input received at the remote control unit for remotely causing the surveying device to obtain a measurement of the target.

24. A surveying device according to claim 22, wherein the control data comprises focus data, the focus data corresponding to user inputs received at the remote control unit for remotely varying a focus of the camera.

25. A surveying device according to claim 19, further comprising an optical sighting mechanism, wherein the camera is included within the optical sighting mechanism.

26. A surveying device for acquiring survey data of a target, the surveying device comprising:

camera means for acquiring real-time image data, the camera means having a field of view;

measurement means for acquiring survey measurements of a target in the field of view of the camera means;

transmission means for transmitting the image data to a remote control unit over a wireless link;

receiving means for receiving control data transmitted from the remote control unit over the wireless link; and control means for controlling the surveying device in response to the received control data to acquire the target within the field of view of the camera means.

27. A surveying device according to claim 26, wherein the surveying device comprises a total station.

28. An apparatus according to claim 26, further comprising:

means for storing the image data;

means for storing the survey measurements; and means for establishing an association between the stored image data and survey measurements.

29. A surveying device according to claim 26, wherein the control data comprises trigger data, the trigger data corresponding to a trigger input received at the remote control unit for remotely causing the surveying device to obtain a measurement of the target.

30. A surveying device according to claim 26, wherein the control data comprises focus data, the focus data corresponding to user inputs received at the remote control unit for remotely varying a focus of the camera means.

31. A surveying device according to claim 26, further comprising optical sighting means for viewing a target, wherein the camera means is included within the optical sighting means.

32. A surveying system comprising:

a surveying device for acquiring survey data of a target, the surveying device including a camera; and a remote control unit in communication with the surveying device over a link, the remote control unit including:

an input device for receiving user inputs for remotely controlling the surveying device;

a transmitter for transmitting control data to the surveying device over a wireless link in response to the user inputs;

a receiver for receiving image data transmitted from the surveying device over the wireless link based on output of the camera; and a display device for displaying images based on the image data.

33. A surveying system according to claim 32, wherein the surveying device comprises a total station.

34. A surveying system according to claim 32, wherein the camera has a field of view, and wherein the surveying device is configured to generate survey measurements of a target within the field of view of the camera.

35. A surveying system according to claim 32, wherein the surveying device is configured to generate an angular measurement based on a current orientation of the camera.

36. A surveying system according to claim 33, wherein the images comprise real-time video images.

37. A method of surveying comprising the steps of:

acquiring images of a target using a camera coupled to a surveying device, the camera having a field of view;

receiving user inputs at a remote control unit, the user inputs for remotely controlling the surveying device, the user inputs including inputs for causing the surveying device to acquire the target within the field of view of the camera;

transmitting control data from the remote control device to the surveying means over a wireless link based on the user inputs;

receiving at the remote control unit data transmitted over the wireless link from the surveying device, the data including image data representing outputs of the camera; and displaying images at the remote control device based on the image data.

38. A method according to claim 37, further comprising the step of generating survey measurements of an object within the field of view of the camera.

39. A method according to claim 38, further comprising the step of storing the survey measurements in association with data representing corresponding images of the target in a memory device.

40. A method according to claim 37, wherein the imaging means has a focus, the method further comprising the step of receiving at the remote control unit user inputs for remotely controlling the focus.

41. A method according to claim 37, further comprising the step of generating an angle measurement based on an orientation of the camera.

42. A method according to claim 37, wherein the surveying device comprises a total station.

43. A method according to claim 37, wherein the image data comprises real-time video data.

44. A surveying system comprising:

a total station for acquiring survey measurements of a target, the total station including:

a first control unit for controlling the total station;

a video camera coupled to the first control unit for sighting and acquiring images of the target;

a measurement unit coupled to the first control unit for generating the survey measurements;

a transmitter coupled to the first control unit for transmitting data over a wireless link, the data including image data corresponding to the images; and a receiver coupled to the first control logic for receiving data over the wireless link; and a remote unit in communication with the total station over the wireless link for allowing a user to remotely control the total station, the remote unit including:

an input unit for receiving user inputs for remotely controlling the video camera;

a transmitter coupled to the second control unit for transmitting data representing the user inputs to the total station over the wireless link;

a receiver coupled to the second control unit for receiving the data transmitted from the total station; and a display device coupled to the second control unit for displaying real-time video images based on the data received from the total station.

45. A surveying system according to claim 44, wherein the input unit comprises:

an aiming control for receiving user input for remotely aiming the video camera; and a focus control for receiving user input for remotely focusing the video camera.

46. A surveying system according to claim 44, further comprising a memory storing the image data in association with corresponding survey measurements.

* * * * *

UNITED STATES PATENT AND TRADEMARK OFFICE
CERTIFICATE OF CORRECTION

PATENT NO.   :   6,034,722
DATED        :   March 7, 2000
INVENTOR(S)  :   Viney et al.

It is certified that error appears in the above-identified patent and that said Letters Patent is hereby corrected as shown below:

In column 8 at line 9, insert --the-- between "to" and "image"

Signed and Sealed this

Twentieth Day of March, 2001

Attest:

NICHOLAS P. GODICI

Attesting Officer        Acting Director of the United States Patent and Trademark Office